Figure 1:
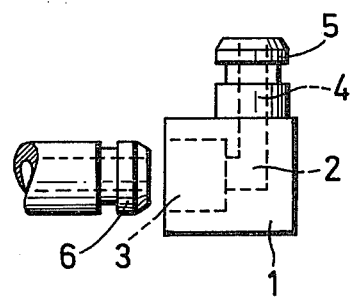

United States Patent [19]

Kramer

[11] Patent Number: 4,471,978
[45] Date of Patent: Sep. 18, 1984

[54] PUSH-PULL CONNECTING SYSTEM FOR PRESSURE LINES, BRAKE-SYSTEM LINES IN PARTICULAR

[76] Inventor: Dieter Kramer, Alte Wipperfuerther Str. 181, 5068 Odental, Fed. Rep. of Germany

[21] Appl. No.: 406,896

[22] Filed: Aug. 10, 1982

Related U.S. Application Data

[63] Continuation of Ser. No. 45,778, Jun. 5, 1979, abandoned.

[30] Foreign Application Priority Data

| Jun. 7, 1978 [DE] | Fed. Rep. of Germany | 2824943 |
|---|---|---|
| Dec. 23, 1978 [DE] | Fed. Rep. of Germany | 2856064 |
| Dec. 23, 1978 [DE] | Fed. Rep. of Germany | 2856069 |
| Mar. 28, 1979 [DE] | Fed. Rep. of Germany | 2912160 |

[51] Int. Cl.³ .......................................... F16L 35/00
[52] U.S. Cl. ........................ 285/321; 285/39; 285/93; 285/158; 285/319; 285/347; 285/351; 285/353; 285/DIG. 21
[58] Field of Search ............ 285/305, 321, 353, 356, 285/319, 93, 39, 384, 158, 393, 347, DIG. 21, 351

[56] References Cited

U.S. PATENT DOCUMENTS

| 1,159,845 | 11/1915 | Kidd | 285/93 X |
|---|---|---|---|
| 1,587,079 | 6/1926 | Machino | |
| 2,413,106 | 12/1946 | Kelle | 285/321 X |
| 2,805,089 | 9/1957 | Hansen | 285/321 X |
| 3,428,340 | 2/1969 | Pelton | 285/95 |
| 3,479,068 | 11/1969 | Brittain | 285/321 |
| 3,523,701 | 8/1970 | Graham | 285/305 X |
| 3,538,940 | 11/1970 | Graham | 285/305 X |
| 3,753,582 | 8/1973 | Graham | 285/305 |
| 3,899,199 | 8/1975 | Gorey | 285/321 X |
| 4,076,279 | 2/1978 | Klotz | 285/305 X |
| 4,105,226 | 8/1978 | Frey et al. | 285/321 X |
| 4,145,076 | 3/1979 | Snow | 285/305 X |
| 4,278,276 | 7/1981 | Ekman | 285/321 X |

FOREIGN PATENT DOCUMENTS

| 2730611 | 8/1978 | Fed. Rep. of Germany . |
|---|---|---|
| 1496244 | 8/1967 | France . |
| 2250951 | 6/1975 | France . |
| 2284818 | 4/1976 | France . |
| 2299588 | 8/1976 | France . |
| 1109105 | 4/1966 | United Kingdom . |
| 1081702 | 8/1967 | United Kingdom . |
| 1084400 | 9/1967 | United Kingdom | 285/321 |

Primary Examiner—Dave W. Arola
Attorney, Agent, or Firm—Michael J. Striker

[57] ABSTRACT

A connecting system for pressure lines, especially plastic pressure lines for brake systems, comprises a housing with a bore therethrough, a male connector having a stem adapted to be pushed into and pulled out of the bore. Locking of the connector in the bore is obtained by a resilient, preferably split retaining ring inserted into an annular groove open towards the bore, which after insertion of the connector into the bore will partially engage in a circumferential groove provided in the stem of the connector.

23 Claims, 28 Drawing Figures

U.S. Patent  Sep. 18, 1984  Sheet 1 of 16  4,471,978

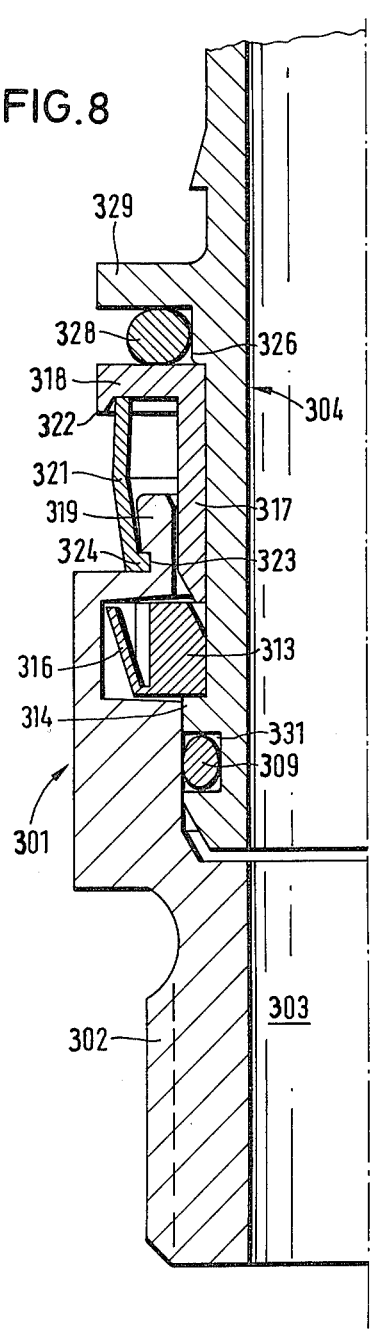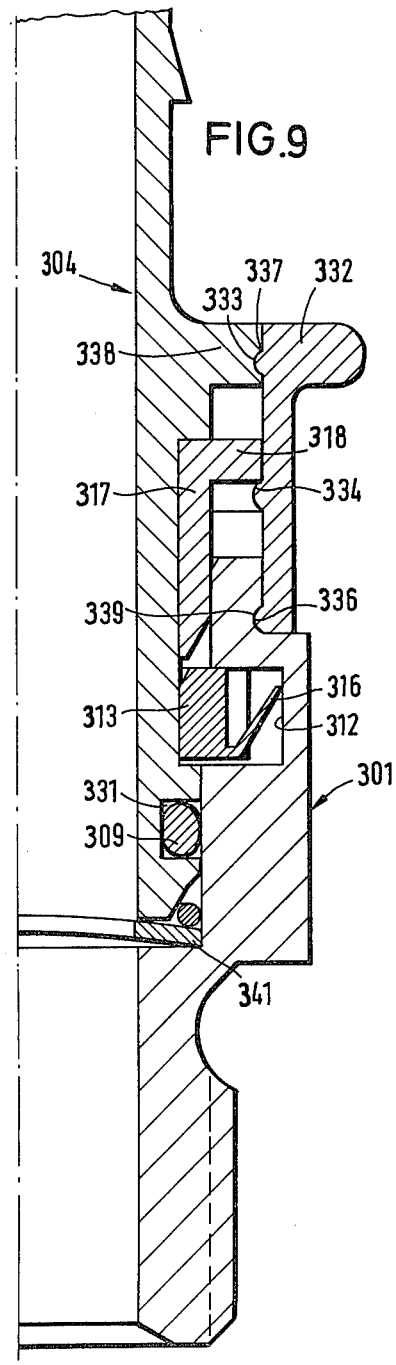

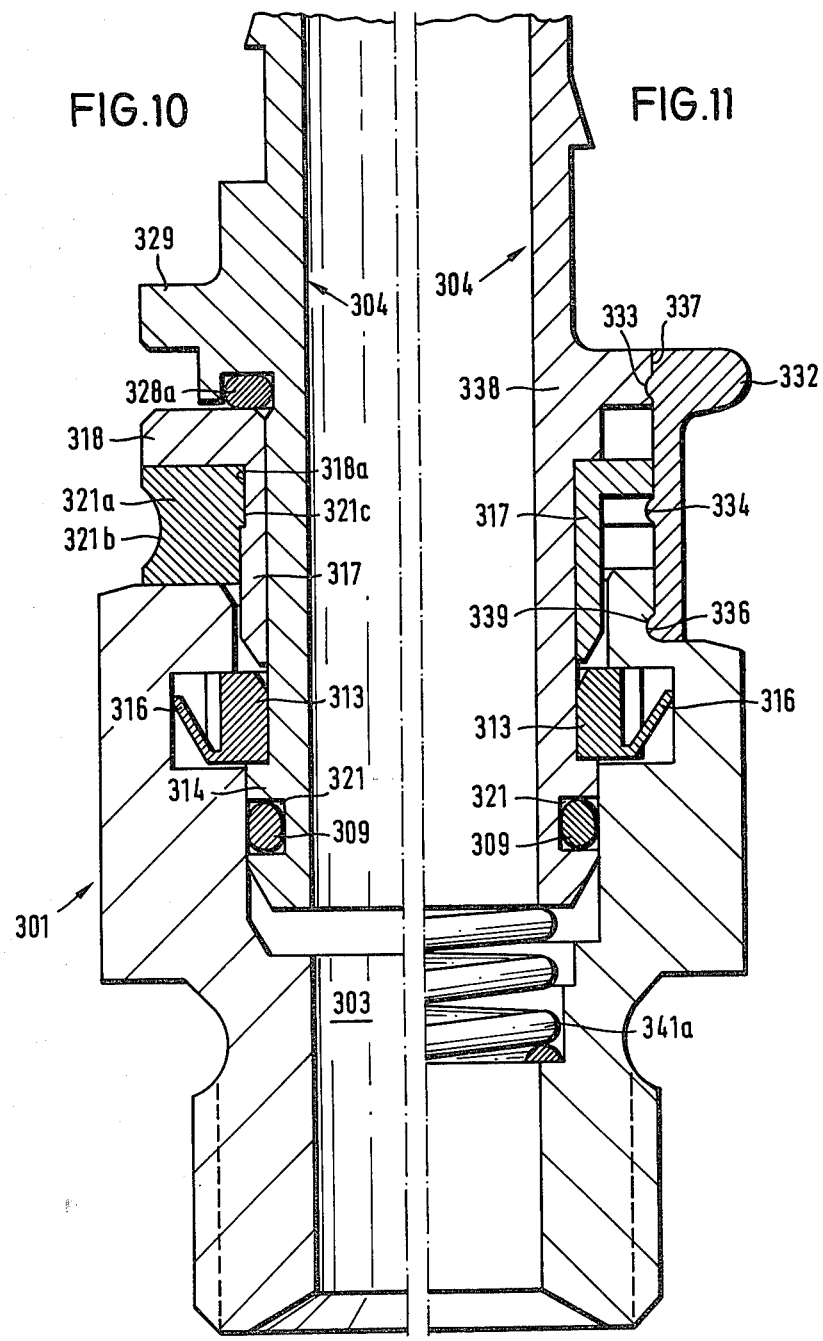

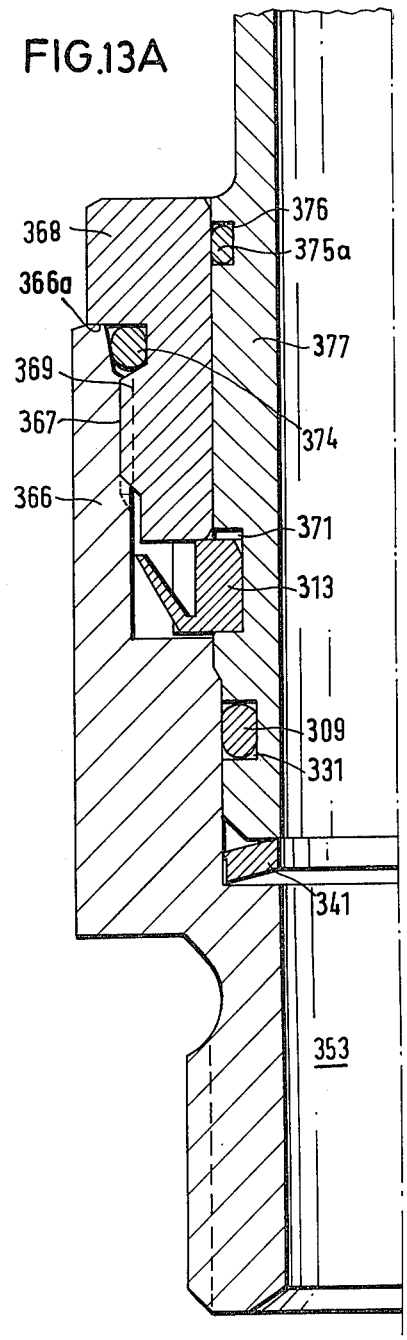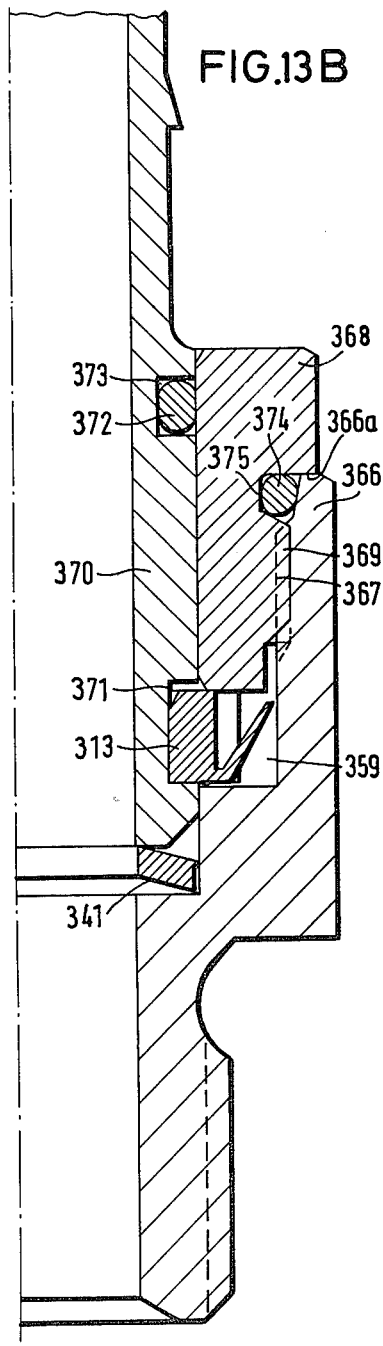

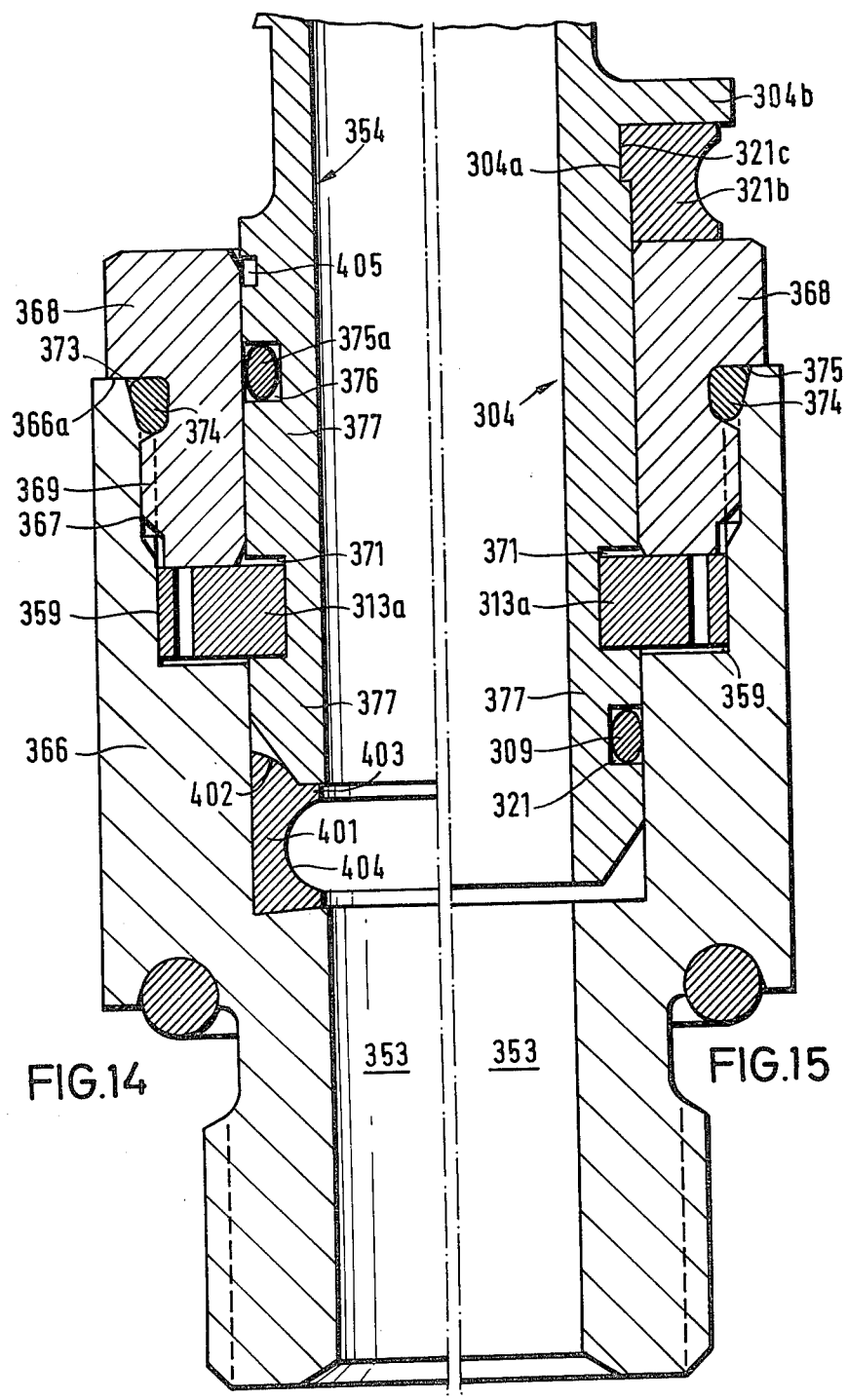

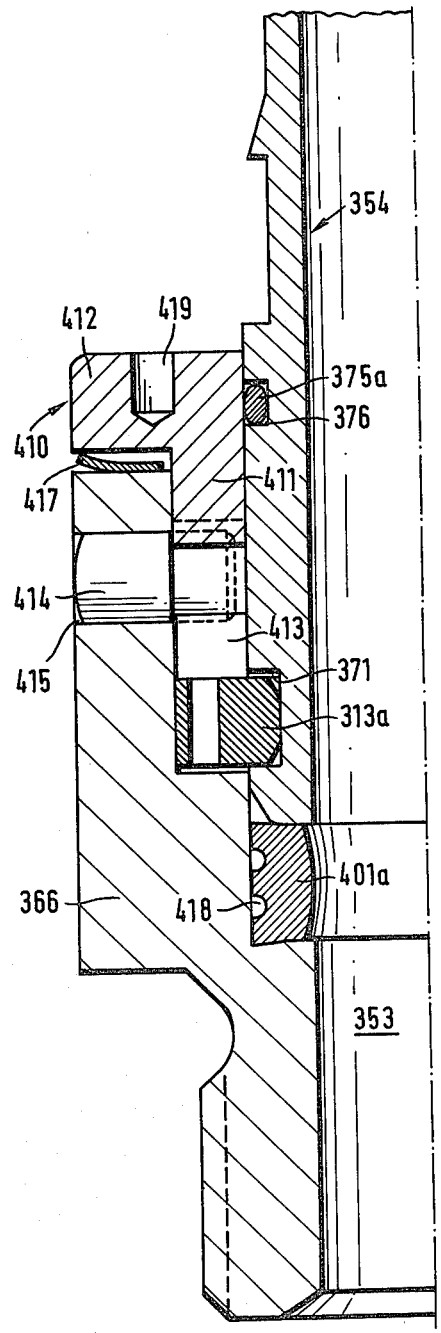
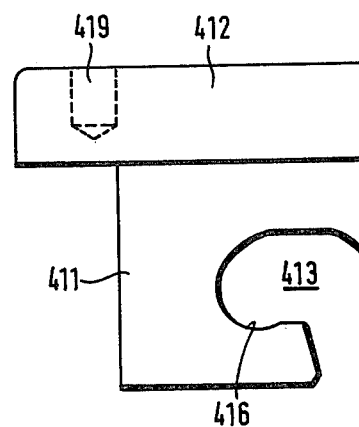
FIG.17
FIG.16

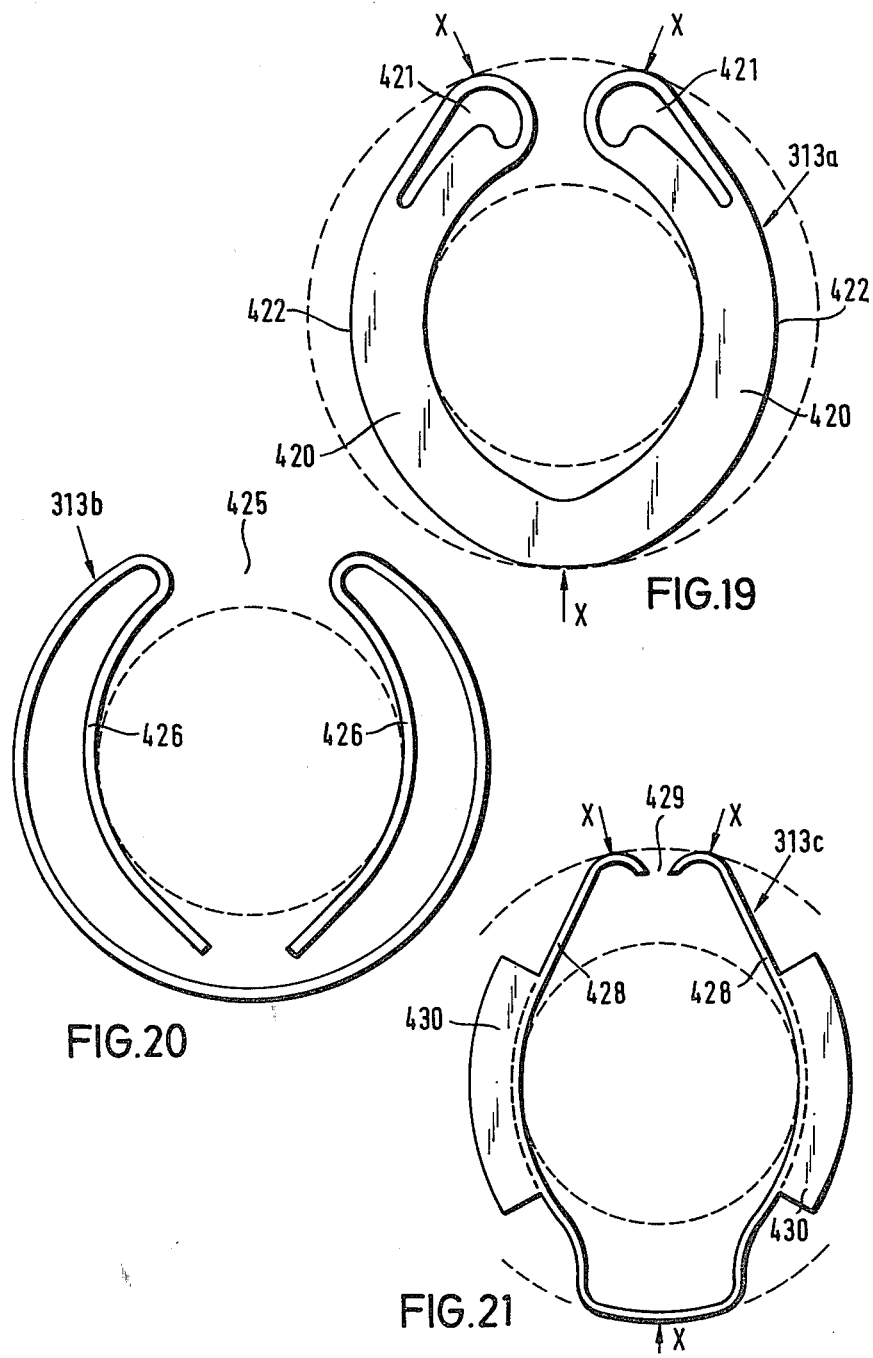

PUSH-PULL CONNECTING SYSTEM FOR PRESSURE LINES, BRAKE-SYSTEM LINES IN PARTICULAR

This a continuation, of application Ser. No. 45,778, filed June 5, 1979, and now abandoned.

The present invention concerns a connecting system for pressure lines, plastic lines for brake systems in particular, consisting of a housing part and a coupling part to be connected to it.

Connecting systems for pressure lines in the hydraulic or pneumatic brake systems of automotive vehicles, consist customarily of threaded connections, where the coupling is screwed into a housing or a connector and forms a seal therein. Such threaded connections are relatively costly in their installation, since they require comparatively much time and space for their installation. There is the further difficulty of detaching individual components from the system, since, due to the threaded connections between all components, these can be detached only by rotating in opposite directions which, however, is usually very difficult on account of the piping connected to these fittings.

The present invention is based upon the task of creating a connecting system for pressure lines, break lines in particular, which will essentially simplify installation and removal, i.e. installation and removal of any desired component of the system.

As per invention, this is attained by utilizing a push-pull system, wherein the housing part has a through bore into which that coupling part designed as male connector can be inserted, forming a seal thereby, and the stem of the connector is held in the through bore by means of a locking device. The push-pull principle as per invention allows problem-free attaching and detaching of individual system components, even in the most confined space, in a very short time, without requiring special tools therefor. As per invention, locking is essentially achieved by a clamping or retaining ring inserted into a circular groove, wherein the circular groove is arranged within the through bore and the clamping ring, when in the locking position, will partially engage a circumferential groove of the male connector stem. The connector, or the housing respectively, can be designed in various ways in order to form a manifold or distributor.

It is possible here, to design the through bore to form a right angle within the housing, so that a connection at a right angle is possible. Furthermore, a tee connection is also possible, with the through bore forming a tee within the housing, with two female ends arranged opposite to each other and an outlet ending in the male connector shaft at a right angle to the former. Design as a so-called L-outlet can also be envisioned. Herein, the through bore in the housing is in T-shape, with two female ends at right angles to each other, and an outlet ending in the male connector stem opposite to one of the female ends. A further suitable development is a double-T outlet wherein, taking a cue from the tee outlet, a further female end is provided in the through bore opposite to the outlet.

Furthermore, it may be of advantage as per invention, to design the housing part as adapter which contains the through bore. This adapter may be inserted into a housing f.i. a valve housing, by threading or pressing in. It is furthermore within the framework of the invention, if the through bore is directly machined with its contour into the housing body, f.i. a valve housing, which can then be called an integrated system.

Locking of the connector stem when in the through bore, may be arranged as a non-release lock. As per invention, conditional opening is possible, wherein release of the connector stem from the locked position is possible, but only by forcible pulling-out with a tool. The invention however desires to allow release of the connector stem from the locking device. With such a releasable system, this may be attained by expanding the retaining ring in the sense of enlarging the inner diameter of the retaining ring. Such expanding may be accomplished by means of a sliding expansion sleeve or a threaded expansion sleeve. Release of the plug stem from the locked position, may also be made by detaching the housing part, or adapter respectively, which contain the through bore. To suit this purpose, the adapter, or housing part respectively, is constructed here of two parts and is provided with either a union nut or thread-in nut, so that on removing these two nuts, the groove holding the retaining ring is being opened, and the latter can be pulled out together with the connector stem. Connection of the two housing parts can also be made by a lock of the bayonet-mount type.

As per invention, locking can be made by a retaining ring which can expand outward within the holding groove of a diameter larger than itself. Herein, a plastic ring with cams or lobes, that may rest within the groove, can be used. A plastic ring, resting within the groove on 3 points, may also be used.

Instead of the plastic ring, the invention also provides for use of a metal ring which is suitably fabricated from flat spring material. A further possibility is a metal ring with an outer diameter as large as the inner diameter of the retaining groove, and which in its interior has several elastic lobes at an acute angle to the connecting axis which will engage the circumferential groove of the male connector.

A further essential feature of the design of the connecting system as per invention is a spring element, arranged in the housing part or in its through bore, which will generate an initial tensioning of the male connector.

Such a spring element may consist of a Belleville spring, a coil spring, or a rubber spring. As per invention, this springing element may also be arranged outside of the housing, or the adapter respectively. In this case, an elastic plastic cap, or rubber spring respectively, may be used. To seal the connecting system as per invention towards the interior in order to prevent leaking of the pressure medium, an O-ring can be used, arranged within a circumferential groove of the male connector below the retaining ring, or within a circumferential groove of the through bore. If a rubber spring, inserted into the housing, is used as springing element, this rubber spring can also function as seal against leaking of the pressure medium. As per invention, it is also of importance that at the same time the connecting system as per invention is sealed against dirt entering from outside. Such sealing can be made by means of a plastic cap set above the housing part, or the adapter, respectively. An O-ring seal may also be used for this purpose.

It is also possible to use a combination of an O-ring, a gasket and a plastic cap. If a rubber spring, provided above the adapter or the housing part respectively, is used for the generation of the initial tensioning, this rubber spring may also be used to ensure sealing to the outside.

As per invention, it is furthermore of essence that it is possible to ascertain when the connector stem has reached its locked position within the housing part, or the adapter, respectively. For this purpose, the connector stem may be marked by means of a groove or a collar, by the position of which, relative to the housing part, the respective position of the connector stem may be read off.

The invention will now be explained more closely using examples of the design of various versions of the coupling system as per invention, or of individual components of the system as per invention respectively, as shown in the attached drawings. Shown in:

FIGS. 1-4 side views of the connecting system as per invention, with various versions of the outlet.

Figure 28:
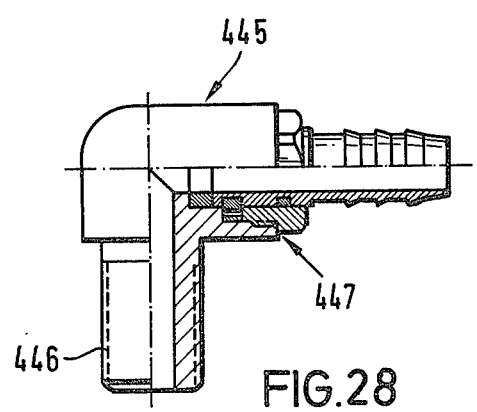

FIGS. 5-16, 18-25, 26, 27 various versions of the connecting system as per invention in section FIGS. 19-24 views of various versions of retaining rings used as per invention, FIG. 28 views of an adapter constructed as angle shape, in partial section.

As shown in FIGS. 1 to 4, a connecting system as per invention, will consist of the housing parts 1, 10, 20, 30 with outlets in various shapes. Thus, FIG. 1 shows a housing part 1 with an outlet at a right angle. For this purpose, a through bore 2 running at a right angle is provided within the housing part 1. This through bore 2 has a female end 3 and an outlet 4 ending in connector stem 5. A coupling part 6 can be inserted into the female end 3 by means of its connector stem. Herein, the connector stem 5 of the outlet 4, and the connector stem of the coupling part 6, are identical to each other.

Figure 2:
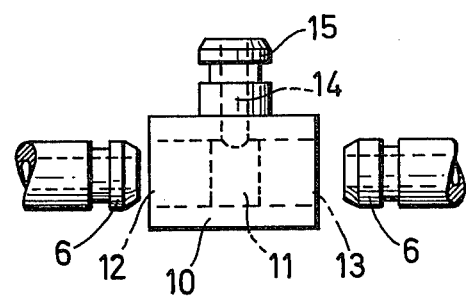

FIG. 2 shows a housing part 10 which has a T-shaped through bore 11. This through bore 11 has 2 female ends 12, 13 located opposite to each other and, at a right angle to it, an outlet 14 which again ends in a connector stem 15. The coupling parts 6 can be inserted with their connector stem into the female ends 12, 13. Herein, the connector stems of the coupling part 6 are of the same shape as the connector stem 15 which is provided as outlet at the housing part 10.

Figure 3:
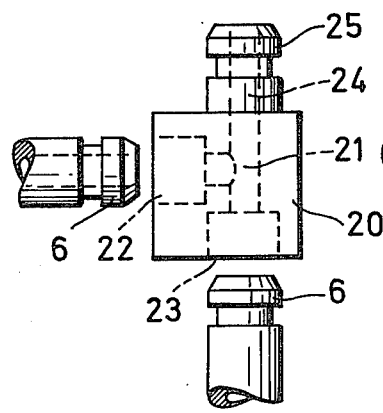

FIG. 3 shows a housing part 20 which again is provided with a through bore 21 in double-T shape. However, with a difference relative to FIG. 2, that here the two female ends 22, 23 are arranged at a right angle to each other, and the outlet 24 constructed with the connector stem 25, arranged here opposite to a female end, in this case the female end 23. Coupling parts 6 with their connector stems can here again be inserted into the female ends 22, 23.

Figure 4:
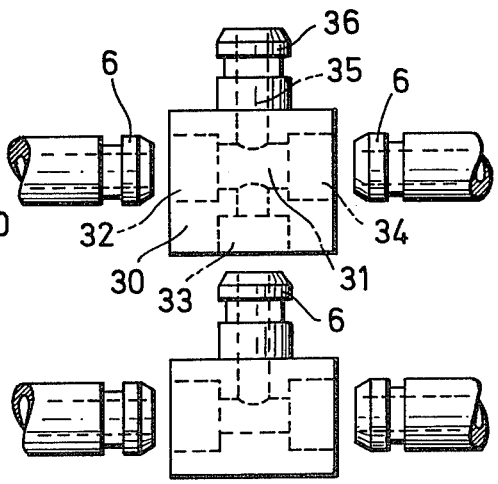

FIG. 4 shows a so-called double-T outlet. The housing part 30 has here a double-T bore 31 provided with three female ends 32, 33, 34. The outlet 35 constructed with the connector stem 36 is arranged here opposite to a female end, in this case the female end 33. Coupling parts 6 with their connector stems, can, here again, be inserted into the female ends 32, 33, 34, with the connector stems 6 corresponding here to the connector stem 36.

The connecting system as per invention may serve, on one hand, to connect brake lines with each other or, on the other, to connect brake lines directly to, for instance, a brake housing. Furthermore, both of the aforegoing may be possible, i.e. to connect the brake lines with each other and simultaneously to connect them to a brake housing. The push-pull connections between the individual system components allows at any time easy inserting into or detaching of the components from each other, and out of the brake housing itself.

Figure 5:
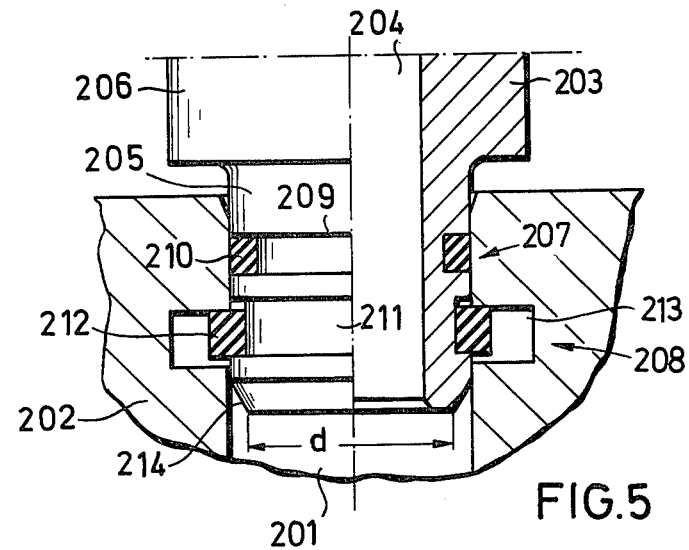

As can be seen, f.i. from FIG. 5, the housing part may be formed directly by an apparatus housing which will then show in its interior the complete interior contours of the through bore. The interior contours of the through bore may however also be accommodated by an adapter, vide f.i. FIGS. 8, 9, which can be threaded into the apparatus housing and pressed into a straight bore of the former, vide FIGS. 26, 27.

The connecting system as per invention, vide FIG. 5, may be designed non-detachable. Therefore, it will consist of a bore 201 within the housing 202, and a male connector 203 with a through bore 204. The contours of the bore 201 correspond to the exterior shape of the connector stem 205 of the male connector 203.

The male connector 203 consists of a housing 206 and a connector stem 205. The housing conforms to the usual design and is therefore shown only in part. It may be a valve housing or a housing of another type.

As per FIG. 5, the male connector has a gasket 207, behind the lock 208 in the direction of insertion. The connector stem 205 has an exterior circumferential groove 209 to house a seal ring 210 which is preferably of elastic material. The seal ring 210 seals against the entry of dirt from the outside as well as against leaks of the braking medium from the inside. The circumferential groove 211 is set next to the groove which partly supports a clamping ring 212 of plastics or metal. The ring 212 is slit and can therefore be expanded. Its exterior diameter is larger than the exterior diameter of the connector stem 205 or the bore 201, respectively. Thus, the ring is also partially supported in a circumferential counter groove 213 within the housing 202. The width of the clamping ring 212 is less than the width of the grooves 213 and 211 so that the male connector 203 may slide within the bore 201 with a small degree of play. For the expanding of the ring 212 inserted prior to connecting, the tip of connector stem 205 is provided with a chamfer 214 wherein the diameter "d" of the chamfer 214 is less than the inner diameter of the ring 212.

Figure 6:
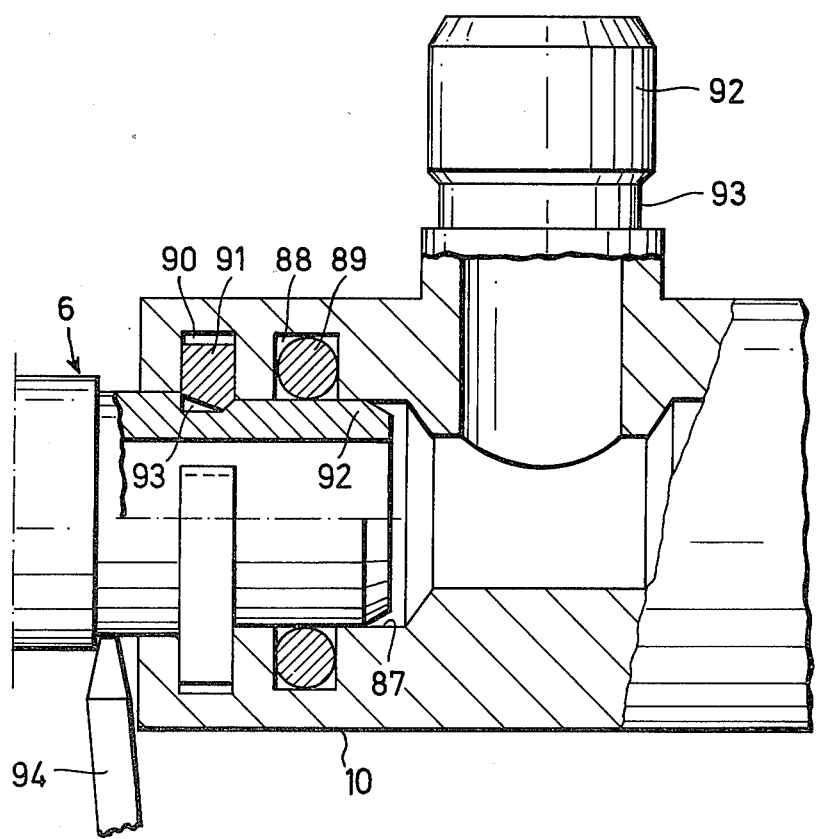

In the version of a connecting system as per invention, shown in FIG. 6, the through bore has a female end 87 which is essentially cylindrical. Herein, an inner groove 88 with a seal ring 89 inserted into it is provided. A further groove 90 is arranged above the groove 88 into which a springing clamping ring 91 made f.i. from plastics and having one slit, is inserted. The connector stem 92 is essentially of cylindrical shape and chamfered at its end. It has a circumferential groove 93 to allow detenting of the clamping ring 91 when the stem is inserted. The interior diameter of the clamping ring 91 in non-expanded state is so chosen that it is smaller than the outer diameter of the connector stem 92 and about equal to the inner diameter of the groove 93. To allow expanding of the clamp 91 on inserting the connector stem 92, the clamp 91 has a conical taper around the edge of the upper inner circumference, which corresponds to the chamfer at the lower end of the connector stem. To allow disengaging of the connection as per invention, it will be further advantage if the clamp 91 is tapered also at the circumference of its lower inner edge and if the groove 93 is correspondingly chamfered at its corresponding abutting face. By this—as shown in the figure—the push-pull connection may be disengaged by means of a tool 94 inserted between the housing part 10 and coupling part 6. Otherwise, the version shown in FIG. 6 corresponds in its details to FIG. 2, it may, however, also be designed f.i. as per FIGS. 1, 3, 4 or 5.

Figure 7:
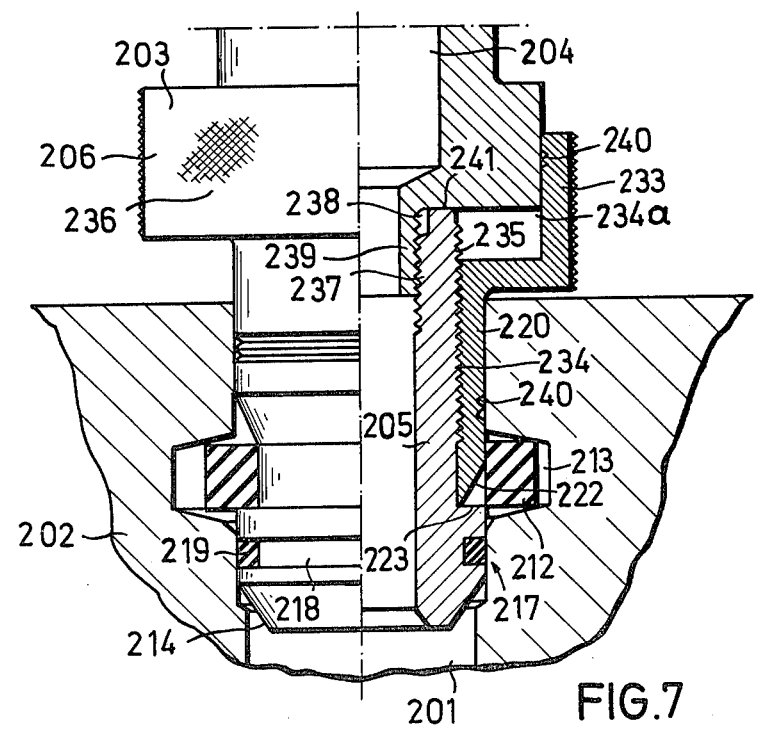

FIG. 7 shows a disengageable connecting device as per invention. Disengaging is ensured here however by a rotating movement.

For this purpose, the head of an expanding sleeve 222, preferably made of plastics, is offset to form a cylindrical chalice 233 which in its opening 234a will accommodate with a mating fit the housing 206 of the male connector 203. The stem of the expanding sleeve 220 bears a multiple interior thread 234, corresponding to the exterior thread 235 on the connector stem 205, with both threads having a steep pitch. The external surface 236 is preferably knurled. By the relative rotation of the expanding sleeve 220 against the male connector 203, a relative axial movement of both parts will ensue, causing disengagement of the clamping ring 212. To simplify installation, the housing 206 is made detachable from the connector stem 205, with a threaded connection in the connector opening having an interior thread 237, and a corresponding exterior thread 238 on the housing stem 239, serving for this purpose.

To deflect dirt from the outside, sealing strips 240 are arranged at the interior of the chalice 233 and at the exterior of the stem of the expanding sleeve 220. A seal 217 ensures that no medium can escape to the outside. The seal 217 corresponds in its design to the seal 207 and comprises a circular groove 218 and an elastic seal ring 219.

The version as per FIG. 7, is of a particularly space-saving design. The chalice requires very little space. The rotary movement can easily be accomplished. Furthermore, installation of this device is very simple with a two-part design of the male connector. The expanding sleeve 220 need not necessarily be constructed expandable.

It is threaded onto the connector stem 205, before the housing 206 is threaded into the connector stem 205. In this version of the invention, a seal in the zone of the sealing edge 241 may additionally be provided between the housing part 206 and the connector stem 205. For the remainder, those parts which are the same as in FIG. 5, are identified by the same reference numbers.

As shown in FIG. 8, a further connecting system as per invention, consists of an adapter 301, which can be inserted or threaded into a bore of a valve body. For this purpose, the adapter 301 has a threaded section 302. The adapter 301 has a through bore 303. A male connector 304 has a connector stem 306. A circumferential groove 312 is located within the adapter 301. A retaining ring 313, preferably made of plastics, is inserted into this groove 312. This retaining ring 313 is split, so that it can expand. The diameter of the retaining ring in non-expanded state is smaller than the diameter of the lower zone of the connector stem. On its outer circumference, the retaining ring has centering lobes 316 pointing diagonally upward from the lower end of the ring. By these centering lobes 316 evenly spaced around the circumference, the retaining ring will, at all times and in any inserted position of the connector stem be centered relative to the longitudinal axis of the coupling system as per invention. The diameter of the connector stem corresponds in its upper zone to the interior diameter of the non-expanded retaining ring 313. An expanding sleeve 317 is pushed onto the upper zone of the connector stem. By sliding the expanding sleeve in the direction of the end of the connector stem, the retaining ring 313 is expanded so that the male connector stem can be pulled out.

To suit this purpose, a conical taper is arranged at the end of the expanding sleeve whilst the retaining ring 313 is chamfered at its internal circumferential edge. On its upper end the expanding sleeve has a circumferential collar 318. A cylindrical protector sleeve 321 is arranged between the lower side of the circumferential collar 318 and the upper end of the adapter 301 which, at that location, has an extension 319 with a reduced diameter. This protector sleeve 321 consists of an elastic, particularly of a springing, material, f.i. a polyamide. The protector sleeve 321 is held in its position by a circular rim 322 arranged at the lower side of the circumferential collar 318, and by a circumferential groove 323 formed within the adapter extension 319, with the protector sleeve engaging the circumferential groove 323 with its inner rim 324. On sliding the expanding sleeve 317 in order to expand the retaining ring 313, the protector sleeve is compressed and will buckle towards the outside. To facilitate buckling, the protector sleeve 312 is given an initial slight outward buckle, before the expanding sleeve 317 is pushed in.

Through the spring-like elastic material of the protector sleeve, the latter acts as a spring, wherein the circumferential collar 318 is pushed against the offset section 326 of the connector stem so that the connector stem will abut with its lower section 314 the non-expanded retaining ring, whereby pre-tensioning is achieved within the coupling device as per invention. By the protector sleeve 321 provided as per invention, sealing is ensured of the entire zone between the expanding sleeve 317 and the adapter 301, and especially of the gap opening between the inner wall of the adapter and the outer wall of the male connector 304. An additional profiled seal ring 328 is arranged around the male connector 304 above the circumferential collar 318, meaning below a circumferential collar 329 on the male connector 304. By this profiled seal ring 328, additional sealing against dirt is accomplished in the inserted state of the male connector 304 i.e. above the expanded sleeve, whilst the profiled seal ring 328 also causes the space above the circumferential collar 318 to be kept free, so that this space cannot be filled with dirt. The profiled seal ring 309 is arranged in a circular groove 331 of the male connector 304.

FIG. 9 shows a further alternative design version of the connecting device as per invention, relating in particular to an altered design of the protector sleeve when compared to the design version as per FIG. 7; this, because in FIG. 8 the protector sleeve 332, is designed as a hollow cylinder and will suitably consist of an elastic plastic. The protector sleeve has 3 circumferential rims 333, 334, 336 around its inner wall, wherein the upper circumferential ring 333 engages in a circumferential groove 337 within a circumferential collar 338 of the connector stem and the lower circumferential ring 336 a circumferential groove 339 in the adapter 301. The central circumferential ring 334 serves as spacer for the expanding sleeve 317. To operate the expanding sleeve 317, the cap is pulled upward thus freeing the expanding sleeve. Such pulling off is readily possible by reasons of the elastic material of the cap. On installing the connecting device as per invention, it is suitable for this purpose to supply the adapter 301 and the protector sleeve 332 in assembled state.

To seal the male connector 304 against the adapter 301, a profiled seal ring 309 is used, which is inserted into a circumferential groove 331 of the retaining ring 313, as shown in FIG. 7. Since the protector sleeve 332 is not exerting a spring force against the expanding sleeve, it is necessary to insert within the adapter a Belleville spring 341 set upon a projection 342 provided within the adapter, the Belleville spring being pressed downward by the connector stem 306 so that a spring force is exerted in the direction opposite to the direction of inserting, whereby pretensioning within the coupling device is generated in turn.

FIGS. 10 and 11 versions of the connecting system as per invention are shown, different from those as per FIGS. 8 and 9 essentially by a different design of the spring elements for generating the pretensioning, and by different sealing elements. For the remainder, parts in FIGS. 10 and 11 corresponding to those in FIGS. 8 and 9, are identified by the same reference numbers.

In FIG. 10, the cylindrical protector sleeve 321 of FIG. 8 is replaced by a cylindrical spring element 321a of rubber-like elasticity, which performs a sealing function towards the outside and also serves as a spring element to generate pretensioning. This spring element 321a has on its outer circumference a circumferential concavity 321b, whereby a reduction of the sectional area is obtained and by which the spring characteristics can be selected. The spring element has around its inner walls a circumferential projection 321c corresponding to a recess 318a around the expanding sleeve 318. by means of an elastic seal ring 328a which is provided in a groove 329a within the circular collar 329, sealing is made of the gap the expanding sleeve 317 and the connector stem 304.

In FIG. 11, differing from the design as per FIG. 9, a coil spring 341a for the generation of pretensioning, is provided in the through bore 303 instead of a Belleville spring, so that the connector stem is inserted against the spring force of the coil spring, by which pretensioning is achieved within the push-pull connection. The coil spring has the advantage over the Belleville spring that the spring force is effective over a long travel of insertion, and that better selection of the spring characteristics can be achieved. Otherwise, the design as per FIG. 11 corresponds to the one as per FIG. 9.

Figure 12A:
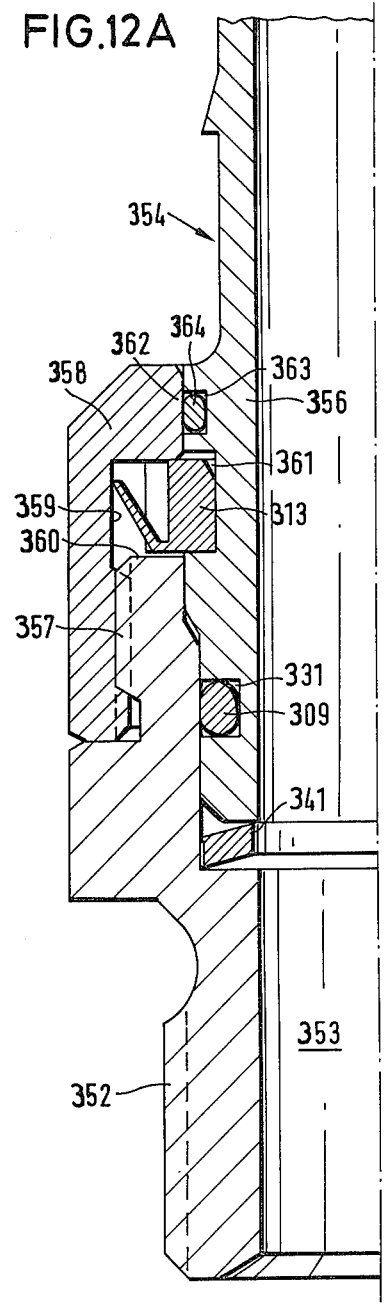
Figure 12B:
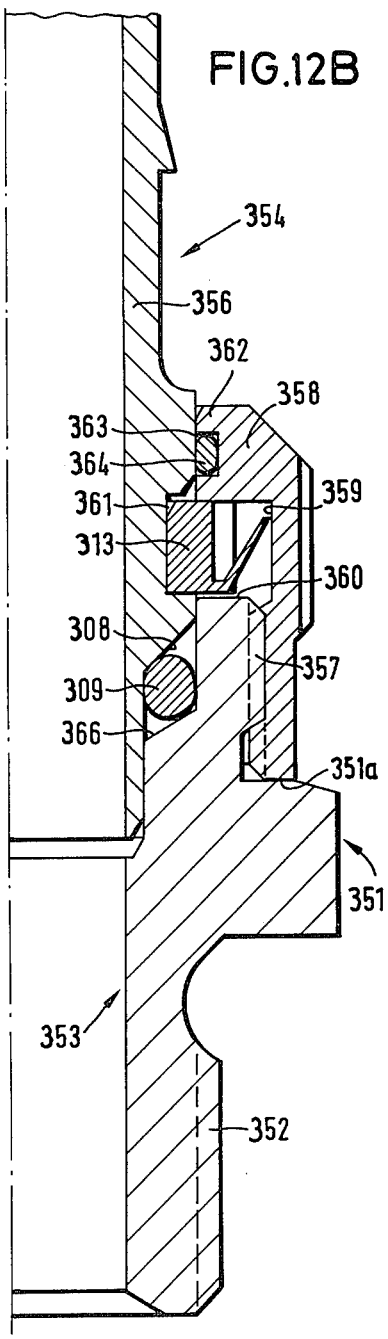

A detachable coupling device is shown in FIGS. 7 to 11, wherein detaching of the male connector from the adapter, or the housing respectively, results from expanding of the retaining ring by means of the expanding sleeve which is threaded or slid into the adapter, so that the connector stem may be pulled out in a upward direction. The following Figures show a different principle for the detachable design of the coupling device as per invention. Therein, detaching is accomplished by having the adapter practically in two halves, wherein a nut is threaded onto or into the adapter, the nut, together with the other adapter part, containing a chamber to accommodate the retaining ring. On removing the nut by threading, the male connector together with the retaining ring can be pulled out. Concerning the various design versions, FIG. 12 shows two alternative design possibilities. The adapter 351 has a threaded section 352, by which it can be threaded into a housing. Futhermore, the adapter has a through bore 353, into which a male connector 354 can be inserted with its connector stem 356. Opposite to the threaded section 352 at the other end of the adapter 351, the latter has an exterior thread 357. A union nut 358 is threaded onto the thread 357. The union nut 358 has a circumferential recess 359 which, together with the face area 360 of the adapter, forms an annular chamber. A retaining ring 313 is located within this annular chamber and corresponds to the retaining ring as described in FIG. 8. The retaining ring, after having been expanded upon insertion of the connector stem, will engage a circumferential groove 361 of the connector stem 356. The union nut 358 has at its upper end a collar 362 with a groove 363 worked into its inner surface, into which the seal ring 364 is inserted. By means of the seal ring, the chamber containing the retaining ring is sealed against the intrusion of dirt from the outside. Sealing of the connector stem 356 against the adapter 351 is made by means of a profiled seal ring 309 abutting a chamfered projection 366 within the through bore. The chamfering of the projection 366 corresponds to the chamfering of the wall surface 308 at the offset 307 of the connector stem. By this arrangement of the profiled seal ring 309 in connection with the chamfered abutment surfaces, a pretensioning is generated within the coupling device, causing the connector stem to be pressed upward against the retaining ring. Concerning the assembling of the coupling device as per invention, first the retaining ring is inserted into the annular chamber by the union nut and adapter, and the profiled seal ring into the through bore. Thereafter, the connector stem is pushed in, wherein the retaining ring will engage the groove of the connecting stem so that coupling has been accomplished. Uncoupling of this connection is accomplished by unscrewing of the union nut.

The left half of FIG. 12 shows an alternative design version, differing on one hand in the accommodation of the profiled seal ring 309, and on the other in the generation of pretensioning in the coupling device. The principal of FIG. 8 has been adapted here, so that full reference to it may be made, wherein the profiled seal ring 309 is arranged in a circular groove 331 of the connector stem 356, with a Belleville spring 341 being provided within the bore, the former being compressed upon pushing-in and thus generating a counter force causing the connector stem being pressed upward against the retaining ring. For the remainder, the design version of this coupling device corresponds to the design version in the right-hand side of FIG. 12.

By strong tightening of the union nut 358 against the abutment face 351a in the adapter 351, both parts are secured against detaching. The threading-in travel of the union nut is so designed that on contacting the abutment face 351a, no touch contact is yet present between the retaining ring 313 and the union nut. FIG. 13 again represents two alternative design versions. A coupling device as per invention is shown in the right half of FIG. 13, wherein a threading-in nut is screwed into the adapter 356 at its end side.

For this purpose, the adapter is provided with an internal thread 367 and the threading-in nut 368 with an external thread 369. By the adapter 366 in connection with the face of the threading-in nut 368 a chamber for the accommodation of the retaining ring 313 is created within the adapter. After insertion of the connector stem the retaining ring will engage a circular groove 371 of the connector stem. Sealing of the connector stem against the adapter or the threading-in nut respectively is made by means of a profiled seal ring 372 which is arranged in a circumferential groove 373 of the connector stem 370 above the retaining ring 313. Thus, the profiled seal ring 372 has a double function, i.e. on one hand sealing toward the exterior against dirt and on the other sealing toward the interior against the discharge of f.i. compressed air. Further sealing towards the interior is made by means of a seal ring 374, arranged at the end of the adapter 366 and the end of the external thread of the threading-in nut between threading-in nut and adapter which will be deformed upon threading-in, so that a secure seal is accomplished also in this zone. To accommodate the seal ring 374, the threading-in nut has at the end of its threaded section a circumferential groove 375. As can be seen from the right-hand side of FIG. 13, the connector stem is made with a diameter of the same size along the entire length of insertion, except in the zone of the circumferential groove 371, thus resulting in a particularly simple production of the connector stem. The design version in the left half of FIG. 13 differs from the one of the right half only in the type of sealing, since in the design version as per the left half, two circumferential seals are provided in the connector stem, namely, a lower circumferential seal for sealing towards the interior by means of a profiled seal ring 309 within a circumferential groove 331 of the connector stem. Sealing towards the outside is made with an additional seal 375a, which is arranged within the circular groove 376 above the retaining ring 313.

Here, too, additional sealing to the interior is possible in the threaded zone between threading-in nut and adapter. Concerning the design of the connector stem 377, it has its diameters in two ranges, namely a range reduced in its diameter within the zone of the seal 309, and a range around the retaining ring and the seal 375a with a diameter larger than the former. Both design versions of FIG. 13 have in common that pretensioning is generated by means of Belleville apring 341 arranged in the adapter. Making of a coupled connection ensues by first inserting the retaining ring into the adapter and then screwing the threading-in nut into the adapter. Thereupon, the male eonnector is inserted into the adapter with its threaded-in nut so that the male connector will engage the retaining ring which is enclosed by the threading-in nut and the adapter. Breaking of the push-pull connection ensues by unscrewing of the threading-in nut. By firmly screwing-in the threading-in nut 368, until it contacts the abutting face 366, both parts are secured against detaching. The threading-in travel is so designed that no contacting the abutting face 366a, no touch contact is yet present between the retaining ring 313 and the end of the threading-in nut.

FIGS. 14 and 15 show, respectively, one version each of the connecting system as per invention, differing from those of FIGS. 13A, 13B by another design of the retaining ring and of the sealing and springing elements. Corresponding parts of FIGS. 14 and 15 on one hand, and FIGS. 13A, 13B on the other, are referred to by the same identifying numbers. As shown in FIG. 14, a rubber buffer 401, of rubber-type elasticity, is arranged on a rim of, and within, the through bore 303. This rubber buffer 401 serves on one hand as a springing element for the generation of pretensioning in the inserted state of the push-pull coupling as shown, and on the other makes a seal to the interior, so that an additional circumferential seal, as shown in FIG. 13A, may be dispensed with. At its inserting end, the male connector 377 has a strong chamfer resulting in a relatively deep, wedge-shaped annular space into which the rubber buffer can push itself in. By the degree of the chamfer of the connector stem, the strength of the seal and of the pretensioning can be regulated. The relatively large chamfer also allows to forgo chamfering of the inner edge of the retaining ring 313. The rubber buffer 401 is so shaped at its face towards the connector stem that, it somewhat fits the contour of the male connector, wherein a section 402 has a convex arch connecting to a horizontal rib 403. By this design in connection with the smooth outer circumferential area, the rubber buffer will, on being deformed by the male connector, be in external contact along its circumference. The internal arching 404 corresponding to the external shape allows the rubber buffer to give-in towards the interior when stressed under pressure. Sealing to the exterior is in the same manner as described in FIG. 13A. A circumferential indicator groove 405 is provided above the groove 376. This indicator groove is so arranged, that after insertion of the male connector into its locked position, it will have just disappeared in the through bore, thus allowing a visual check whether, and how far, the male connector has been inserted and is locked. A collar can also be provided instead of a groove. The rubber buffer 401 is suitably made from relatively stiff rubber.

The design version as per FIG. 15 differs from the one as per FIG. 14, since here sealing to the exterior and generation of the pretensioning is achieved by one and the same element, whilst sealing to the interior is accomplished by means of a seal ring 309 as described in FIG. 13A. Sealing to the exterior and generation of pretensioning is provided by the cylindrical element 321d of rubber-like elasticity, as already used for the same purpose in FIG. 10, so that reference may be made to the explanations given therein. The collar 321c corresponds here to a matching recess 304a in the connector system. In the present example, the connector stem 304 has a rim 304b instead of the expanding sleeve, with the element 321b being arranged between it and the face of the threading-in nut 368.

FIG. 16 shows a further version of a connecting system as per invention. Here, however, the adapter has no threading-in nut, but this part of the adapter 366 is designed as a bayonet-mount type locking element. The locking element 410 has a cylindrical part 411 and a circular collar 412. A bayonet-mount groove 413 is shaped into the cylindrical part 411, running upwards perpendicular at first, and then transiting into a horizontal section. At the side of the adapter housing two locking pins 414 are set, opposite to each other, in horizontal bores 415 projecting into the through bore 303. For attachment within the adapter housing 366, the locking element is inserted into it from the upper side in such a manner, that the pins 414 will engage the locking groove of the bayonet-mount.

Having contacted the pins 414, the locking element is rotated so that the pins 414 are coming to rest in a recess 416 of the horizontal zone. The locking element is held in this locked position by means of a Belleville spring 417 arranged between the circular collar 412 and the adapter 366. This Belleville spring 417 serves simultaneously as seal for the gap accommodating it. The retaining ring 313 is designed corresponding to the one of FIGS. 14 and 15. The connector stem 377 is designed corresponding to the one of FIG. 14, so that reference may be made to the latter. In the present design example too, the connector stem is sealed towards the interior against the through bore - as in FIG. 14 - by a rubber buffer which at the same time generates pretensioning. The rubber buffer 401a shown in FIG. 16 has at its external circumferential area, circumferential grooves 418, serving to maintain elasticity, the channel diameter, and a tight seal. For the remainder, this rubber buffer corresponds in its functions essentially to the one of FIG. 14. Two holes are arranged opposite to each other in the face of the circular collar 412, into which a tool for inserting and detaching of the locking element can be inserted.

Figure 18:
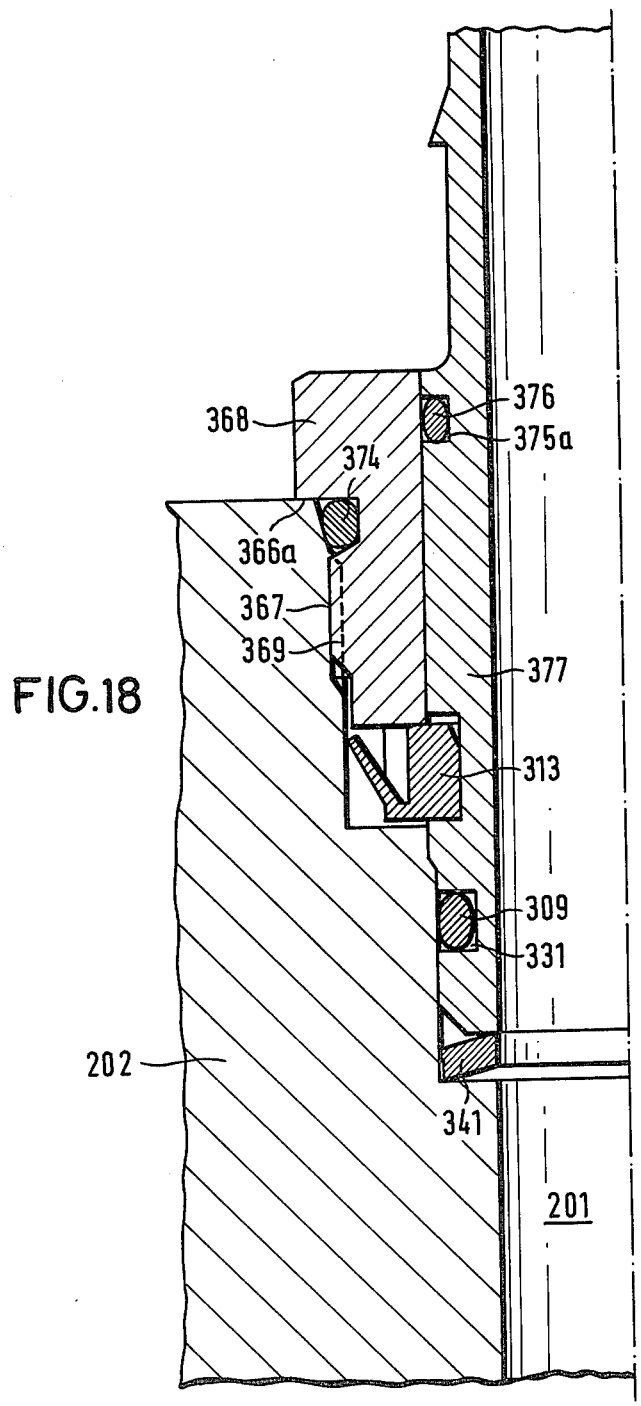

FIG. 18 shows a design example of the push-pull system as per invention, wherein a detachable connection after the principle as per FIG. 13A is dealt with. Herein, the threading-in nut 368 is, however, not screwed into an adapter, but directly into a housing body, f.i. into a valve housing, so that the through bore 303 of the adapter as per FIG. 13A, is now directly formed, in part by the housing 202 and in part by the threading-in nut along its entire internal contour. Regarding the sealing elements and the elements for the generation of pretensioning, these correspond to those of FIG. 13A.

Figure 22:
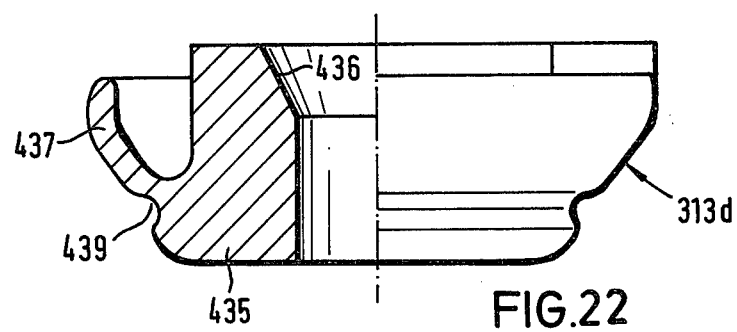

FIGS. 14, 15, 16 show a retaining ring 313a of plastics, the exact shape of which can be seen from FIG. 19. Herein, a self-centering retaining ring is dealt with. The retaining ring 313a is of an oval basic shape and is split, with two equal arching arms 420, joined at one end, are the result. The retaining ring 313a encloses an oval opening 421 so that a somewhat tangential contact of the retaining ring in two opposite zones along the circumference of the connector stem will result. The circumference of the connector stem is shown as a broken line. The arms 420 have flats their exterior, at about the center of the arms, so that on inserting into the accommodating groove, a 3-point contact of the ring will result. The contact points are indicated by the arrows. The contours of the contacting area of the groove are also shown by a broken line. In the zone of the free ends of the arms, the latter have recesses or through holes 421, respectively, tapering out towards the ends and being largest in the zone of the contact points. These recesses allow compressing and thus giving-in of the arms when inserting the male connector. Furthermore, the flats 422 of the arms 420 allow giving-in of the retaining ring in this zone. FIGS. 20, 21, and 22 show further possibilities for the design of retaining rings, which may be used in the push-pull system as per invention, instead of the retaining ring 313 and 313a.

The retaining ring 313b as per FIG. 20, is made of a metallic spring strip, f.i. with a width 3 mm and a thickness 0.5 mm. This retaining ring 313b is bent in circular shape and has a slot 425. By reasons of the circular shape, it will abut along the circumference within the accommodating groove of the through bore. At both ends of the slot, the retaining ring has two arch-shaped arms 426 bent towards the interior in directions opposite to each other, and enclosing an oval area so that they will encircle the inserted male connector, its circumferential contours indicated by a broken line, appropriately tangential at opposite zones. The arms 426 are of spring-type elasticity so that they can spring back on insertion of the connector stem.

The retaining ring 313 as per FIG. 21, is also made of metallic spring strip. It consists of two arms 428 joined at one end and symmetrical around the vertical axis. The arms 428 also enclose an oval area so that they encircle, about tangentially, the connector stem indicated by a broken line. The free ends of the spring arm 428 are bent around towards the interior and separated from each other by a slit 429. The zone where the free ends are bent around, serves to abut the wall of the accommodating groove of the through bore. The points of abutment are marked by the arrows X. A further zone of abutment, also indicated by an arrow X, lies opposite the slit 429. Thus, the retaining ring 313 abuts the accommodating groove at three points. In the central zone of the arms, the contact areas 430 of the spring arms 428 are, respectively, on the upper and lower side, bent at a right angle towards the exterior. The contact areas 430 support the circular spring within the accommodating groove, and as an abutting area against the male connector.

Figure 23:
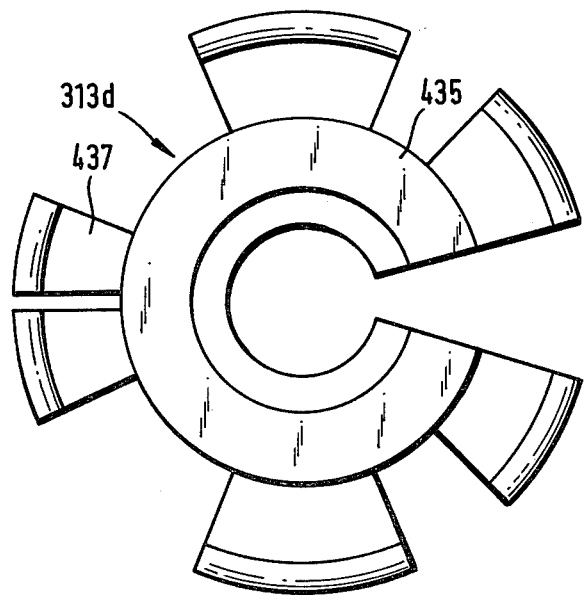

A further alternative for a retaining ring for a connecting system as per invention, is shown in FIGS. 22 and 23. This retaining ring 313b is made of plastics and consists of a split cylindrical annular body 435 with a chamfer 436 at the upper inside edge at the inserting end. Lobes 437, bent upward, extend around the lower end of the annular body. Five lobes are provided in the example shown. These lobes 437 serve for the centering of the retaining ring and by reason of their resilience, ensure a spring-type elastic action of the retaining ring on insertion of the male connector. The lobe 437 opposite the slit 438, is split, so that additional expansion of the retaining ring is possible. In their zone of transition to the annular body, the centering lobes 437 show a flute 439, by which a weakening and thus a defined place of bending is achieved. At their free ends, the lobes are running upward somewhat vertical, which results in secure abutment and guiding.

Figure 24:
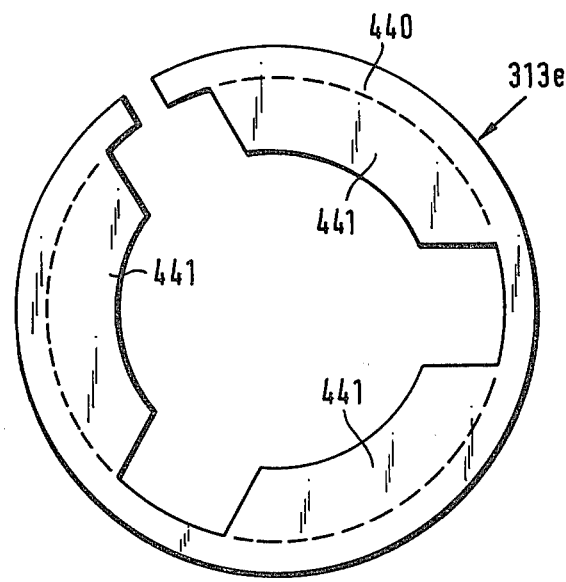
Figure 25:
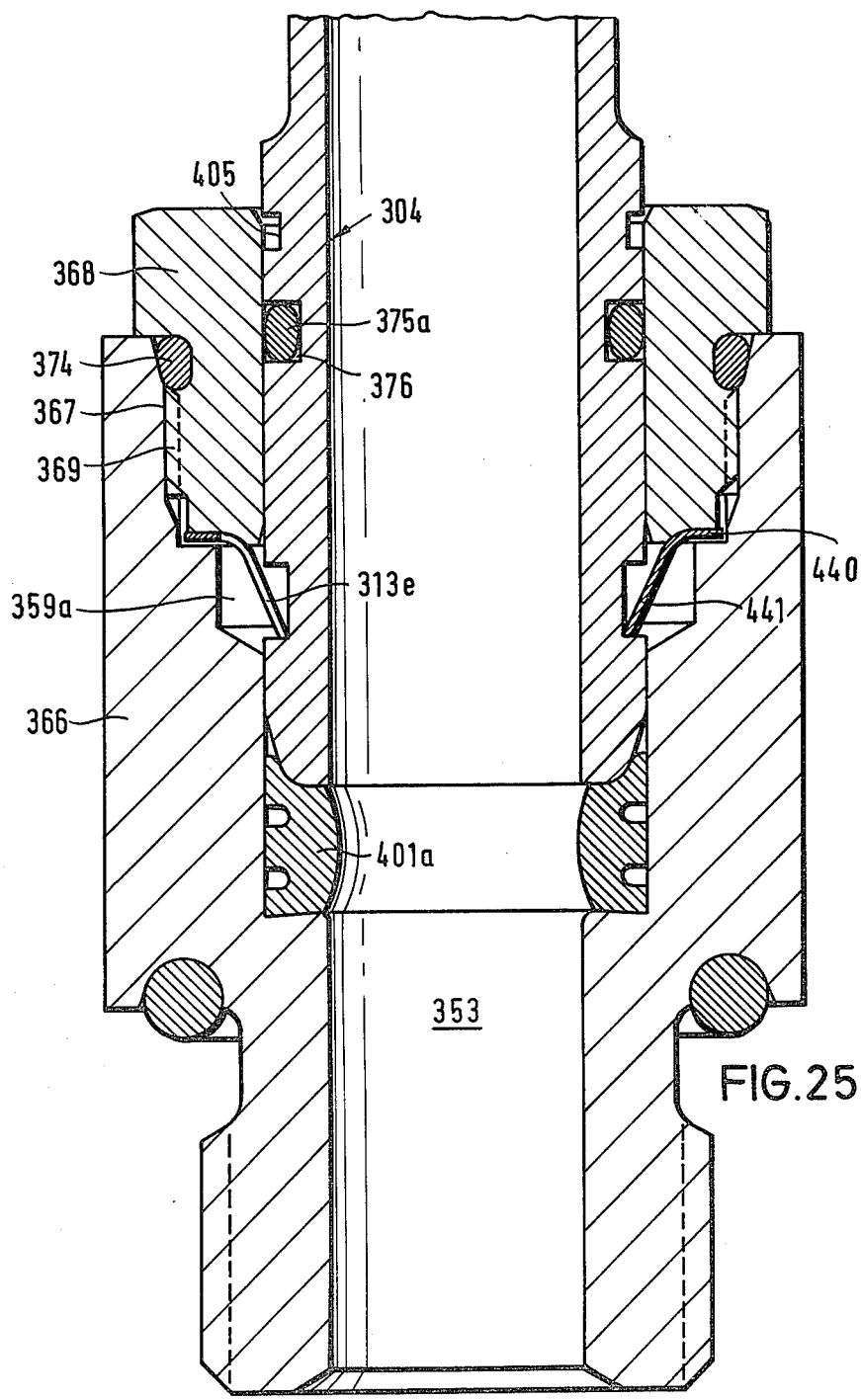

FIG. 24 shows a retaining ring 313a, made as a metallic ring from spring strip. This retaining ring has an annular body 440 of a somewhat horizontal construction, its outer diameter corresponding to the outer diameter of the accommodating groove. Springing lobes 441, standing at an acute angle to the axis of insertion are bent in the direction of insertion from the inner edge of this annular body, which may be split or not split. These lobes 441 serve for locking of the male connector. Herein, the magnitude of the holding power of the lobes depends upon the inclination at which they are set. FIG. 25 shows the retaining ring 313a inserted into a connection as per invention. The construction of the coupling system corresponds herein to the one of FIG. 14 so that the respective parts are identified by the same reference numbers. Differing from FIG. 14 are the retaining ring, the accommodating groove and the rubber buffer. The rubber buffer 401a shown in FIG. 25, corresponds in its design and function to the one of FIG. 16. The retaining ring 313e is accommodated by a circumferential groove 359a into which the lobes 441 extend. The annular body of the retaining ring rests herein on the projection formed by the groove 359a.

Figure 26:
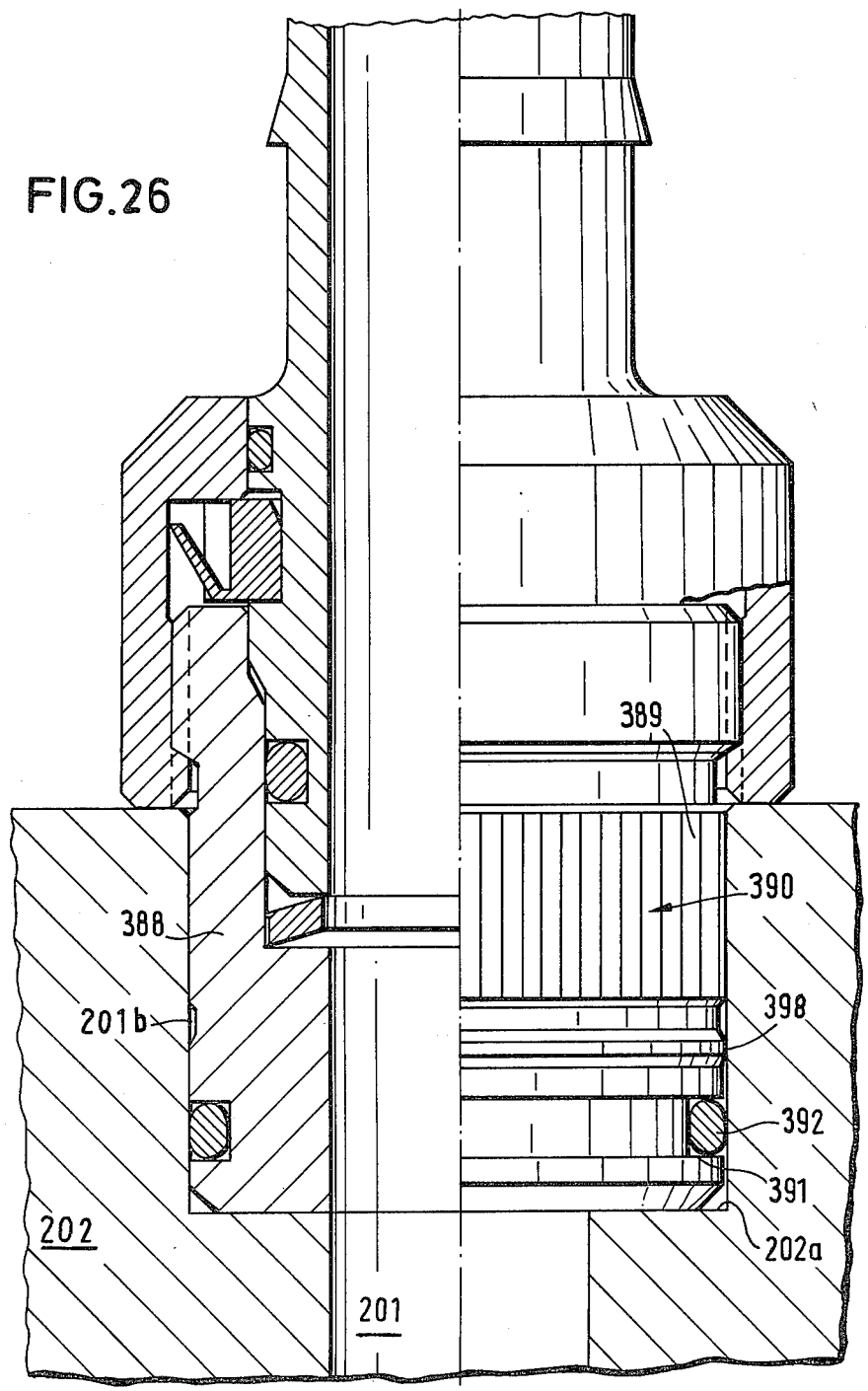
Figure 27:
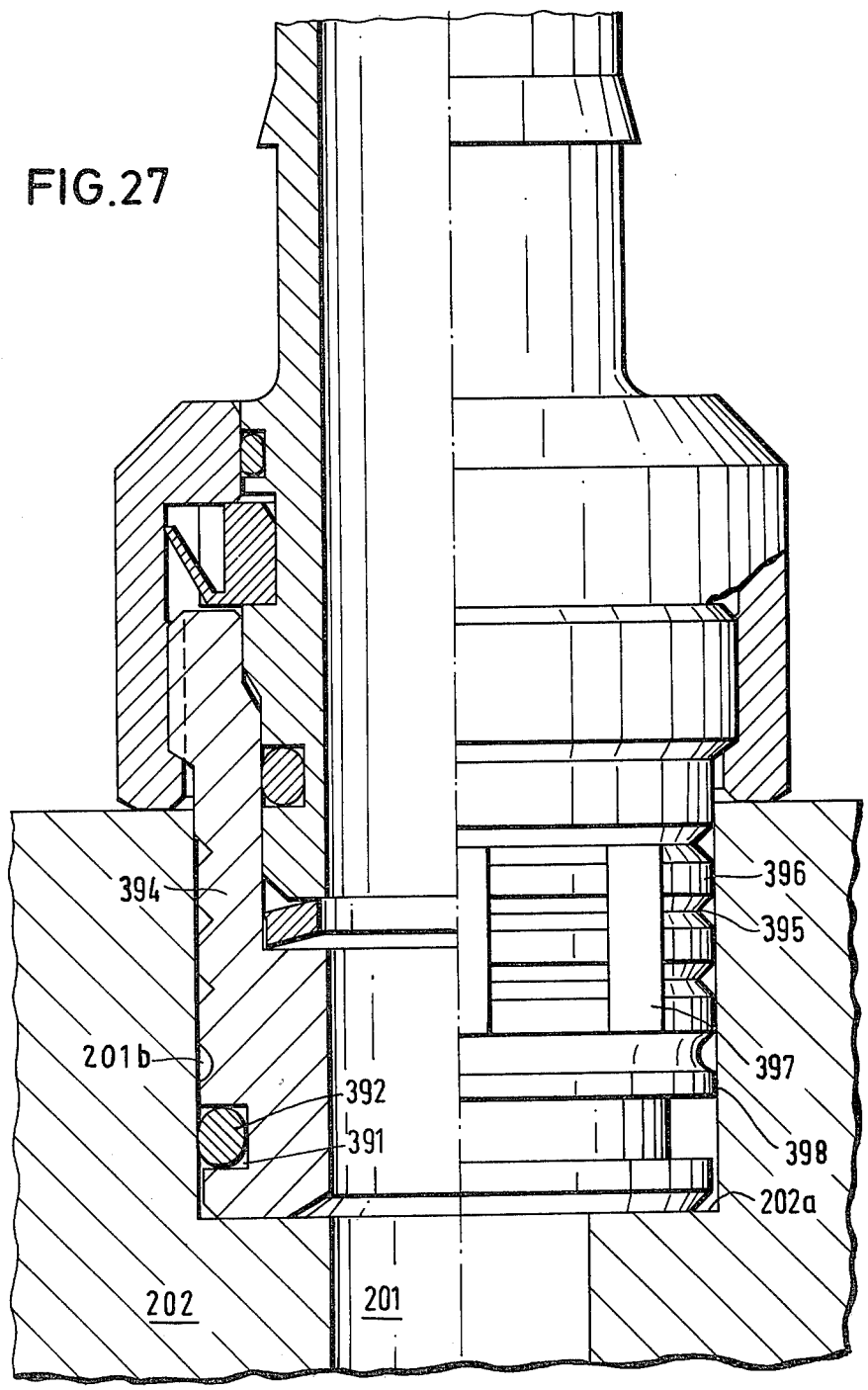

In FIGS. 26 and 27, two alternative versions of the design adapter are shown, namely at the zone of its end by which it is inserted, up to a stop 202a, into a housing 202.

Differing from the design version described before, the adapter has no threaded section, but is inserted into the housing 202 with a press fit. In FIG. 26, the corresponding adapter section 388 is therefore provided at its circumferential area with the knurl 389, which consists of individual wedge 390, and the adapter section 388 including the wedges, has an excess dimension against the diameter of the bore of the housing 202. Thereby, upon inserting of the adapter, the parts will be pressed against each other in such a manner that the wedges will penetrate the inner wall of the bore, so that the adapter is locked in the bore with a press fit. The knurl 389 furthermore achieves safety against rotation. With this version, it is particularly important, that the strength of the material of the adapter is higher than that of the housing. In the lower zone of the adapter section 388, the latter has a circumferential groove 391 with a seal ring 392 by which sealing is achieved.

FIG. 27 shows a alternative version for the insertion of the adapter, wherein the lower adapter section 394 is provided with circumferential indentations 395. The diameter of the adapter section in the zone of the lands 396 between the indentations 395 is greater than the inner diameter of the bore, so that deformation ensues upon insertion, whereby the lands will press themselves into the housing 202. The indentations 395 are interrupted by longitudinal notches 397 whereby additional safety against rotation is achieved. Here, too, sealing to the interior is made by means of a seal ring 392 within a circular groove 391 in the lower zone of the adapter section 394.

To achieve guiding of the adapter or inserting, the adapter section 388, 394, have a cylindrical guide zone 398 which, in the respective case, is set ahead of the circumferential groove 391, with its outer diameter corresponding to the inner diameter of the housing bore.

The aforenamed design versions of the adapter for inserting into a housing, are applicable to all connecting devices described in the above example of design.

FIG. 29 shows an adapter designed as formed part 445, having on one side an inserting thread 446 and on the other a plug connector 447. In the example shown, an L-shaped formed part is represented. However, tees with two plug connections or double tees with three plug connections can be used within the framework of the connecting system as per invention. The invention is not limited to the examples of design as described above; furthermore, individual elements of the system as per invention, which are identical in their functions, are exchangeable.

I claim:

1. A connecting system for pressure lines, particularly plastic pressure lines for brake systems, comprising housing means formed with a bore therethrough, said housing means including a first housing part having a stepped inner wall and a second housing part threadingly engageable with said first housing part and defining a lower abutment face which overlaps a step in said inner wall and forms with a part of said inner wall a first annular groove; a male connector having a stem portion insertable into said bore and provided in said stem portion with a second annular groove which is transversely alignable with said first annular groove; a retaining ring of a resiliently deformable material, said ring resting on said step of said first housing part and in its released condition when the threading engagement of the two housing parts is loosened, extending in the path of movement of said stem portion past said second annular groove so as after being deformed by the inserted connector to snap into said second annular groove while, when the second housing part is fully screwed into said first housing part, said lower abutment face compresses said retaining ring against said step and the extended deformed part of the ring tightly engages aid second groove; spring means between said connector and said housing means for pressing said connector against said retaining ring; said retaining ring engaging a peripheral surface of said first annular groove at three points and comprising two uniformly curved arms integrally connected to each other at one end and having opposite said one end a free end, said arms being curved at a greater radius of curvature in the middle thereof than at said connected end, and said arms being provided at the free ends thereof with cut-outs increasing in width towards said free ends.

2. A connecting system for pressure lines, particularly plastic pressure lines for brake systems, comprising housing means formed with a bore therethrough, said housing means including a first housing part having a stepped inner wall and a second housing part threadingly engageable with said first housing part and defining a lower abutment face which overlaps a step in said inner wall and forms with a part of said inner wall a first annular groove; a male connector having a stem portion insertable into said bore and provided in said stem portion with a second annular groove which is transversely alignable with said first annular groove; a retaining ring formed of a band of spring material, said ring resting on said step of said first housing part and in its released condition when the threading engagement of the two housing parts is loosened, extending in the path of movement of said stem portion past said second annular groove so as after being deformed by the inserted connector to snap into said second annular groove while, when the second housing part is fully screwed into said first housing part, said lower abutment face compresses said retaining ring against said step and the extended deformed part of the ring tightly engages said second groove; spring means between said connector and said housing means for pressing said connector against said retaining ring; said retaining ring engaging a peripheral surface of said first annular groove at three points and comprising two mirror-symmetrically arranged curved arms integrally connected to each other at one end, said arms enclosing an oval area and having at a middle region thereof a greater radius of curvature than in the other region thereof, said arms having opposite said connected ends free inwardly bent ends.

3. A connecting system for pressure lines, particularly plastic pressure lines for brake systems, comprising housing means formed with a bore therethrough, said housing means including a first housing part having a stepped inner wall and a second housing part threadingly engageable with said first housing part and defining a lower abutment face which overlaps a step in said inner wall and forms with a part of said inner wall a first annular groove; a male connector having a stem portion insertable into said bore and provided in said stem portion with a second annular groove which is transversely alignable with said first annular groove; a retaining ring formed of a band of spring material, said ring resting on said step of said first housing part and in its released condition when the threading engagement of the two housing parts is loosened, extending in the path of movement of said stem portion past said second annular groove so as after being deformed by the inserted connector to snap into said second annular groove while, when the second housing part is fully screwed into said first housing part, said lower abutment face compresses said retaining ring against said step and the extended deformed part of the ring tightly engages said second groove; spring means between said connector and said housing means for pressing said connector against said retaining ring; said retaining ring engaging a peripheral surface of said first annular groove at three points and comprising two mirror-symmetrically arranged curved arms integrally connected to each other at one end, said arms enclosing an oval area and having at a middle region thereof a greater radius of curvature than in the other region thereof, said arms having opposite said connected ends free inwardly bent ends and each of said arms has in the middle region thereof at upper and lower edges of said band of spring material outwardly projecting portions extending substantially normal to the remainder of the band and forming abutment faces for said retaining ring.

4. A connecting system for pressure lines, particularly plastic pressure lines for brake systems, comprising housing means formed with a bore therethrough, said housing means including a first housing part having a stepped inner wall ans a second housing part threadingly engageable with said first housing part and defining a lower abutment face which overlaps a step in said inner wall and forms with a part of said inner wall a first annular groove; a male connector having a stem portion insertable into said bore and provided in said stem portion with a second annular groove which is transversely alignable with said first annular groove; a retaining ring formed of a band of spring material, said ring resting on said step of said first housing part and in its released condition when the threading engagement of the two housing parts is loosened, extending in the path of movement of said stem portion past said second annular groove so as after being deformed by the inserted connector to snap into said second annular groove while, when the second housing part is fully screwed into said first housing part, said lower abutment face compresses said retaining ring against said step and the extended deformed part of the ring tightly engages said second groove; spring means between said connector and said housing means for pressing said connector against said retaining ring; said retaining ring engaging a peripheral surface of said first annular groove at three points; and said band of spring material forming said retaining ring having an outer substantially circular portion and two inwardly bent spring arms integrally connected to said outer portion and forming at the junction of said outer portion with said inwardly bent spring arms a gap.

5. A connecting system for pressure lines, particularly plastic pressure lines for brake systems, comprising housing means formed with a bore therethrough, said housing means including a first housing part having a stepped inner wall and a second housing part threadingly engageable with said first housing part and defining a lower abutment face which overlaps a step in said inner wall and forms with a part of said inner wall a first annular groove; a male connector having a stem portion insertable into said bore and provided in said stem portion with a second annular groove which is transversely alignable with said first annular groove; a retaining ring formed of a band of spring material, said ring resting on said step of said first housing part and in its released condition when the threading engagement of the two housing parts is loosened, extending in the path of movement of said stem portion past said secondannular groove so as after being deformed by the inserted connector to snap into said second annular groove while, when the second housing part is fully screwed into said first housing part, said lower abutment face compresses said retaining ring against said step and the extended deformed part of the ring tightly engages said second groove; spring means between said connector and said housing means for pressing said connector against said retaining ring; said retaining ring engaging a peripheral surface of said first annular groove at three points; said band of spring material forming said retaining ring having an outer substantially circular portion and two inwardly bent spring arms integrally connected to said outer portion and forming at the junction of said outer portion with said inwardly bent spring arms a gap; and said outer portion defining an outer radius of curvature substantially equal to that of the outer peripheral surface of said first groove and said inwardly bent spring arms defining between themselves a substantially oval space.

6. A connecting system for pressure lines, particularly plastic pressure lines for brake systems, comprising housing means formed with a bore therethrough, said housing means including a first housing part connected to a line and having a stepped inner wall provided with an internal thread and a second housing part having an outer wall provided with an external thread which is engageable with said first housing part and defining a lower abutment face which, in the engaged condition of said two housing parts extends substantially parallel to a step in said inner wall and forms with said step and a part of said inner wall a first annular groove; a male connector having a stem portion insertable into said bore and provided in said stem portion with a second annular groove which is transversely alignable with said first annular groove; a retaining ring of a resiliently deformable material, said ring resting on said step of said first housing part and extending in radial direction in the path of movement of said stem portion past said second annular groove so as after being deformed by the inserted connector to snap into said second annular groove; and spring means between said connector and said housing means for pressing said connector in an axial direction against said retaining ring so that the radially extended part of the ring tightly engages said second groove and said lower abutment face.

7. A connecting system as defined in claim 6, wherein the retaining ring has a flat annular configuration defining an outer part located between said lower abutment face of said second housing part and said step of said first housing part and an inner portion which slopes radially inwardly in the path of movement of said stem portion of the connector to snap into said second annular groove.

8. A connecting system as defined in claims 6 or 7, wherein the spring means between said connector and said housing means is in the form of a plate spring, said bore in said housing means being a stepped bore having a large diameter portion into which said stem portion of said connector is inserted and a small diameter portion forming at the junction of said small diameter and said large diameter portions an abutment face, said spring means engaging with opposite ends an end face of said stem portion of said connector and said abutment face at said junction.

9. A connecting system as defined in claims 6 or 7, wherein said male connector has at a portion thereof projecting beyond said housing means a radially outwardly extending annular collar spaced from and spacing an end face of said second housing part; and second spring means in the form of a rubber spring arranged between said collar and said end face.

10. A connecting system as defined in claims 8 or 9, wherein said male connector is provided in said stem portion thereof with an additional annular groove upwardly spaced from said second annular groove, and an O-ring located in said additional annular groove for sealing said male connector with respect to said housing means.

11. A connecting system as defined in claim 6, wherein said ring is of plastic material and provided with elastic centering lobes abutting against a peripheral surface of one of said annular grooves.

12. A connecting system as defined in claim 11, wherein said retaining ring comprises an annular body provided with a radially extending slot therethrough, said lobes projecting outwardly from said annular body, wherein said retaining ring is of plastic material engaging a peripheral surface of said first annular groove at three points and being of a substantially oval configuration.

13. A connecting system as defined in claim 12, wherein said retaining ring comprises two uniformly curved arms integrally connected to each other at one end and having opposite said one end a free end, said arms being curved at a greater radius of curvature in the middle thereof than at said connected end, said arms being provided at the free ends thereof with cut-outs increasing in width towards said free end.

14. A connecting system as defined in claim 6, wherein said retaining ring is formed from a band of metal spring material, said ring comprising two mirror-symmetrically arranged curved arms integrally connected to each other at one end, said arms enclosing an oval area and having at a middle region thereof a greater radius of curvature than in the other region thereof, said arms having opposite said connected ends free inwardly bent ends.

15. A connecting system as defined in claim 14, wherein each of said arms has in the middle region thereof at upper and lower edges of said band of metal spring material outwardly projecting portions extending substantially normal to the remainder of the band and forming abutment faces for said retaining ring.

16. A connecting system as defined in claim 6, wherein said retaining ring defines a slotted annualar body provided with inwardly bent resilient arms.

17. A connecting system as defined in claim 13, wherein said retaining ring is in the form of a band of metal spring material defining an outer substantially circular portion and two inwardly bent spring arms integrally connected to said outer portion, said outer portion having an outer radius of curvature substantially equal to that of the outer peripheral surface of said first groove and said inwardly bent spring arms defining between themselves a substantially oval space.

18. A connecting system as defined in claim 6, wherein said retaining ring has a flat configuration defining an annular outer portion having an outer diameter substantially equal to the outer peripheral surface of said first annular groove, and a plurality of resilient lobes projecting from the inner circumference of said annular portion in the path of movement of said connector and including with said annular portion an obtuse angle.

19. A connecting system as defined in claim 16, wherein said retaining ring is of a band of metal spring materia.

20. A connecting system as defined in claim 6, wherein said second housing part is provided with a flange overlapping the end face of said first housing part and an annular recess arranged in said second housing part between the external thread thereof and said flange to receive a sealing ring which is compressed between said two housing parts.

21. A connecting system as defined in claim 6, wherein said male connector is provided at the upper region of said stem portion thereof with grooves for receiving sealing O-rings.

22. A connecting system as defined in claim 21, wherein said male connector is provided at an upper region of said stem portion thereof with a circumferentially extending indicator groove serving to check the degree of insertion of said connector into said bore.

23. A connecting system for pressure lines, particularly plastic pressure lines for brake systems, comprising housing means formed with a bore therethrough, said housing means including a first housing part having a stepped inner wall provided with an internal thread and a second housing part having an outer wall provided with an external thread which is engageable with said first housing part and defining a lower abutment face which, in the engaged condition of said two housing parts extends substantially parallel to a step in said inner wall and forms with said step and a part of said inner wall a first annular groove; a male connector having a stem portion insertable into said bore and provided in said stem portion with a second annular groove which is transversely alignable with said first annular groove; a retaining ring of a resiliently deformable material, said ring resting on said step of said first housing part and extending in radial direction in the path of movement of said stem portion past said second annular groove so as after being deformed by the inserted connector to snap into said second annular groove; and metal spring means between said connector and said housing means for pressing said connector in an axial direction against said retaining ring so that the radially extended part of the ring tightly engages said second groove and said lower abutment face.

* * * * *